Jan. 10, 1956   W. K. J. HERBOLD   2,730,176
MEANS FOR LOOSENING PIPES IN UNDERGROUND BORINGS
Filed March 25, 1952                                    4 Sheets-Sheet 1
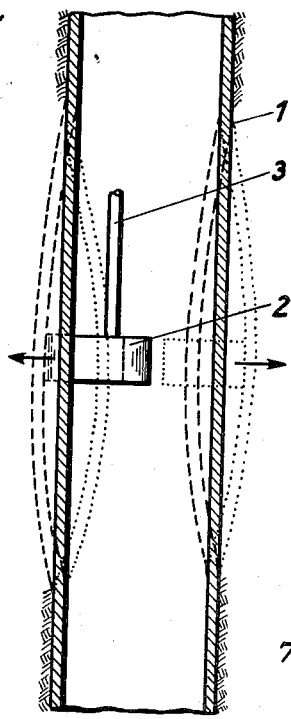
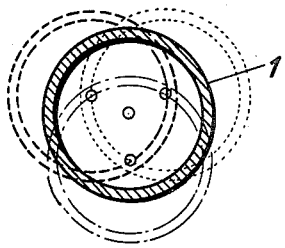
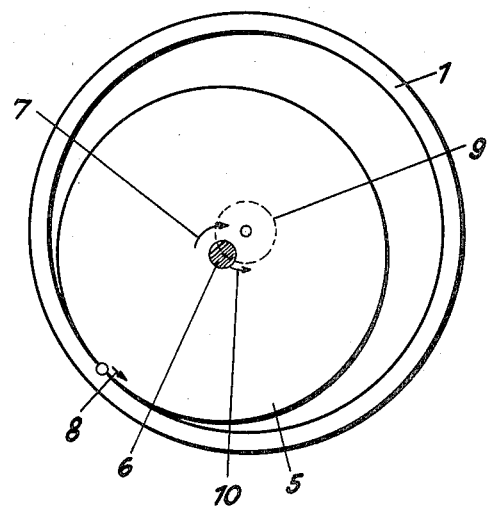
INVENTOR.
WOLFGANG KONRAD JACOB HERBOLD
BY Robert H. Jacob
AGENT Jan. 10, 1956  W. K. J. HERBOLD  2,730,176
MEANS FOR LOOSENING PIPES IN UNDERGROUND BORINGS
Filed March 25, 1952  4 Sheets-Sheet 2

INVENTOR.
WOLFGANG KONRAD JACOB HERBOLD
BY
*Robert H. Jacob*
AGENT

Jan. 10, 1956  W. K. J. HERBOLD  2,730,176
MEANS FOR LOOSENING PIPES IN UNDERGROUND BORINGS
Filed March 25, 1952  4 Sheets-Sheet 3

INVENTOR.
WOLFGANG KONRAD JACOB HERBOLD
BY
Robert H. Jacob
AGENT

Jan. 10, 1956  W. K. J. HERBOLD  2,730,176
MEANS FOR LOOSENING PIPES IN UNDERGROUND BORINGS
Filed March 25, 1952  4 Sheets-Sheet 4
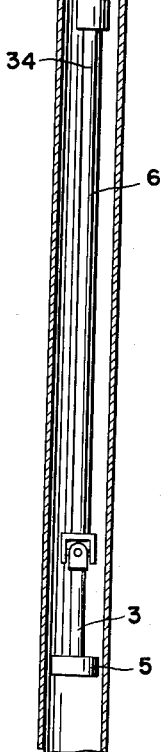
FIG. 11.
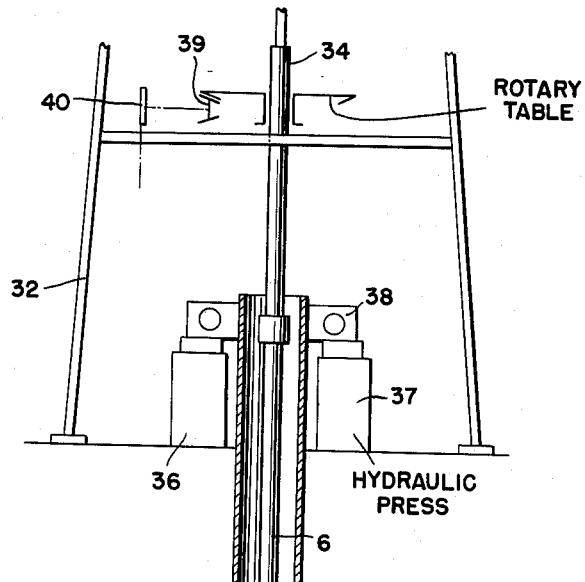
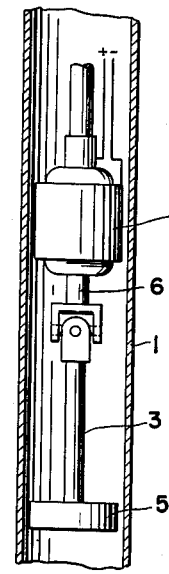
FIG. 12.
FIG. 13.
INVENTOR.
WOLFGANG KONRAD JACOB HERBOLD
BY
*Robert H. Jacob*
AGENT

United States Patent Office 2,730,176
Patented Jan. 10, 1956

2,730,176

MEANS FOR LOOSENING PIPES IN UNDERGROUND BORINGS

Wolfgang Konrad Jacob Herbold, Bruehl (Bezirk) Koeln, Germany

Application March 25, 1952, Serial No. 278,525

5 Claims. (Cl. 166—177)

Pipes mounted in subsurface borings are of considerable value. The complete salvaging of such pipes is often impossible because the frictional forces between the pipes and the rock bed are greater than the permissible axial pulling force which may be exerted to pull the pipes out of the hole and which is limited by the threaded connections.

A method for loosening firmly lodged pipes or rods in underground borings is known in which longitudinal vibrations are imparted to the pipes, above the ground, the frequency of which is the same or nearly the same as the natural frequency of the fundamental or the harmonic vibration of the exposed portion of the lodged pipe.

The effective depth at which this known method can be utilized is, of course, limited and moreover, it is difficult to apply large pulling forces to the pipes simultaneously with the oscillations.

The present invention relates to a new method of loosening firmly lodged pipes in subsurface borings by means of vibrations or oscillations and consists essentially in subjecting the pipes at the settled places to local transverse forces to produce oscillatory movements while simultaneously applying pulling forces.

Thus, in accordance with the invention, the pipes are subjected to oscillatory movements at given points along their lengths. This oscillatory movement in the pipes causes the pipes momentarily to assume a waving shape or form. The crests of the waves momentarily formed in the pipe walls press against the earth. When the waves decrease in intensity at the end of a cycle of oscillatory movement the adhesion between the earth and the pipe along the length of the pipe subjected to such oscillatory movement has been eliminated or substantially reduced. The tubes are made to oscillate within their elastic limits by a mass rolling around their inner walls in the manner of a swinging rope. The oscillations or swinging movements are applied where the pipes are lodged and a large longitudinal pulling force is applied to the pipes simultaneously by means of hydraulic presses. When the tubes have been freed from the earth's pressure at a particular place, as may be determined by expansion measurements in a well known manner, the location of the oscillations may, if required, be progressively moved downwardly until the tubes are again movable either entirely or to a desired extent.

The method in accordance with the invention can be carried out in different ways.

For example, the tubes can be subjected at the lodged places to rotating outwardly directed forces which are in a radial direction with respect to the circular cross section of the tube so that the tubes are brought into rotary swinging movements in arcuated or loop form in the manner of a skipping rope. This can be achieved, for example, by a mass which is rotatable by a drill rod around a longitudinal axis in one direction and is brought into circular rolling and frictionally engaging contact with the inner walls of the tube at the lodged locations as hereafter more fully described. This method can advantageously be further developed in such a manner that the mass proper is itself rotating and made to roll along the inner wall of the tube in the direction opposite to direction of rotation of its driving axis. Thus the mass operates on the inner wall of the tube on the principle of a pendulum but with a small precession cone.

A further object of the invention is the various arrangements for carrying out the method on which it is based. Such an arrangement consists essentially of a mass which is rotatable around a longitudinal axis which can be made to rotate by driving means at any desired position in the pipes. The driving may, for example, originate from above ground by way of the drill rod or the mass proper can be provided with a special prime mover, as, for example an electric motor or a water turbine which is sunk into the bore hole with a rotatable mass.

Thus in accordance with this embodiment of the invention a circular disk of somewhat smaller diameter than that of the pipes to be loosened can be secured to a vertical shaft which is suspended from a drill rod by means of a universal joint. The drill rod is made to rotate at normal boring speed as in boring with a revolving table, and the universal joint allows free sidewise movement of the disk in any direction while simultaneously transmitting the driving power.

When the circular disk presses firmly against the inner wall of the pipe, the disk rolls on the inner wall in a direction opposite to the direction of rotation of the revolving table. The vibrations or oscillations of the pipe start immediately upon rotation of the disk and reach their maximum proportions rapidly. If the diameter of the rolling disk is $d$ cm. and the inner diameter of the pipe is $D$ cm. the frequency of vibration of the pipe is dependent upon the ratio $$\frac{d}{D-d}$$

of the disk and pipe diameters. Thus if the rolling disk is only slightly smaller than the diameter of the pipe the ratio becomes very large and the frequency of the resultant transverse forces which are effective radially and rotationally upon the inner wall of the pipe reach their maximum proportions for a given angular speed of rotation of the drill rod. Since bore pipes are frequently coated with oil or thick slurry, the frictional force between the rolling disk and the inner wall of the pipe is at first not sufficiently great for starting the rolling process which should possibly occur without slipping. For that reason the disk can be magnetized either by a permanent magnet or an electric magnet. Because of the magnetic force the disk will forcefully press against the inner wall of the pipe and on starting the rotary movement by means of the rotary table the rolling process begins at once and also an extremely great centrifugal force sets in which insures of rolling without slipping. In accordance with the invention it is also possible to suspend one or more such swinging disks in alignment, where only one needs to be a magnetic disk. It is known from the art of gyration that a gyrating body places itself in oblique position if an opposing precession movement is imposed in addition to the rotary movement.

If the magnetic force of the rolling disk is made sufficiently strong, the universal joint may even be dispensed with, because the elastic properties of a drill rod will provide for the necessary freedom of lateral movement. The construction of the swingers can be carried out in various ways, for example, rolling disks can be arranged upon a rod one at the top and one at the bottom, only one of which needs to be magnetic in order to insure of engagement being established.

It is possible accordance with the invention to provide not only an arrangement for imparting local vibratory movement to settled pipes, but also to construct the rolling disk as a pipe cutter by providing it at its outer periphery with suitable cutting teeth.

A pipe cutter of that type can be set into motion by means of the same principle of movement and used for cutting off the pipes. It is also possible to construct a tube cutter of this type in such a manner that two disks are arranged one above the other, one of which is provided with cutting edges. In this connection embodiments are possible in which the upper disk is under the effect of a permanent magnet.

Further advantageous details in accordance with the invention are shown in the drawings where the invention is explained by way of example and in which Figs. 1 and 2 illustrate the principle in accordance with the invention by means of a longitudinal and a transverse cross section;

Fig. 4 illustrates schematically the pendulum principle;

Fig. 11 is an elevational view partly in cross section of a hydraulic press for pulling the pipes out of bore holes and a rotary table of a normal rotary drive mechanism and embodying the present invention;

Fig. 12 is an elevational view partly in cross section of a modification of Figs. 1, 2 and 3, wherein an electric motor is lowered into the pipe with the rotating mass and embodying the present invention; and Fig. 13 is an elevational view partly in cross section of a modification of Fig. 12, wherein the electric motor is replaced by a water turbine and embodying the present invention.

Figure 3:
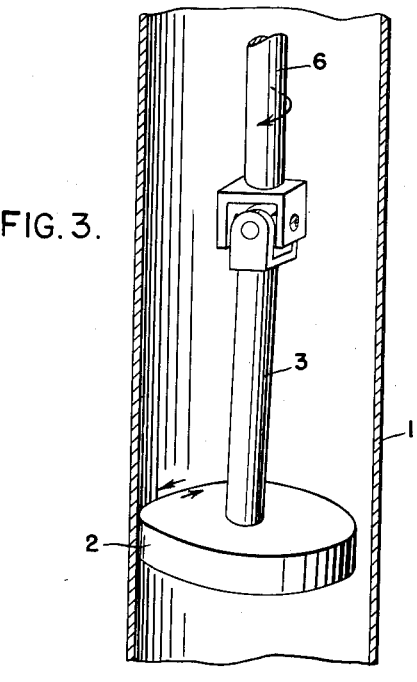
Fig. 3 is an elevational view partly in cross section of a modification of Fig. 1 wherein the mass proper rolls along the inner wall of the tube in a direction opposite to the direction of rotation of its driving axis and embodying the invention.

In the embodiment in accordance with Fig. 1 the pipe 1 built into a subsurface bore is subjected to the effects of a rolling mass 2 at the locations where it is lodged in the earth, which mass rolls along the inner wall of the pipe 1 and thus exerts upon the pipe outwardly effective centrifugal forces. Pipe 1 is thus subjected to rotary swinging movements in loop form as illustrated in the drawing by dashed or dotted lines schematically and in an exaggerated manner. The drill rod is here indicated at 3. As shown in Fig. 3 the rolling mass 2 is itself rotating and made to roll along the inner wall of pipe 1 in a direction opposite to the direction of rotation of its driving axis or rod 3. Mass 2 operates as a pendulum with a small precession core.

Figure 9:
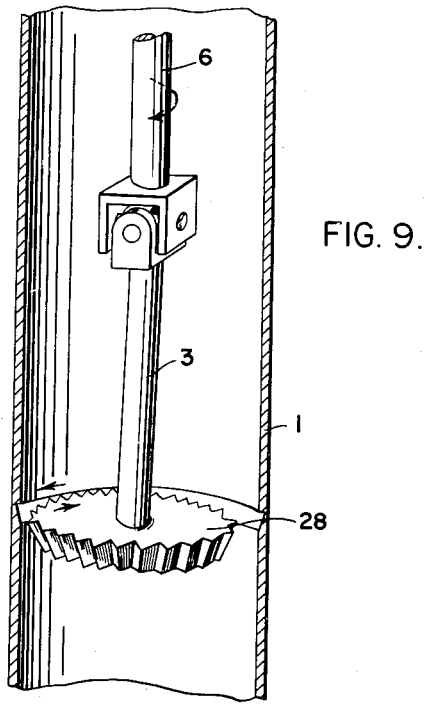
Fig. 9 is an elevational view partly in cross section of a modification of the structure shown in Figs. 1, 2 and 3, wherein the rotating disk is removed and a pipe cutter substituted therefor and embodying the invention.
Figure 10:
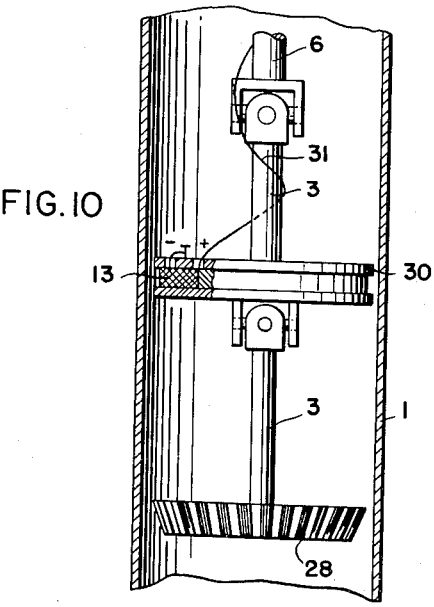
Fig. 10 is an elevational view partly in cross section of a modification of the structure shown in Figs. 1, 2, 3 and 9, wherein the rotating disk is replaced by a cutter blade and a permanent magnet disk is axially arranged above the cutter blade and embodying the invention.

At the same time the pipe is subjected to pulling forces in axial direction by means of hydraulic presses, shown in Fig. 11, of the type utilized for pulling pipes. Owing to the effect of the mass 2 the pipe 1 executes circular or rotary swinging movements in loop form in the manner of a skipping rope and is thereby loosened from the earth's pressure in the region of the swinging movements. It can be determined by known expansion measurements longitudinally of pipe 1 whether the pipes have been sufficiently loosened. The individual points at which the tubes are lodged or held firmly to the earth are located by measuring the elastic expansion of the pipes which occurs with a predetermined increase in the pulling force applied to the end of the pipe. This relationship is in accordance with Hooke's law and is known to the man skilled in the art. Thus, the exact point at which the pipe is free to move longitudinally may be determined and the rotating mass 2 lowered to that point for rotating action. The mass 2 may remain in the pipe while a pulling force is exerted on the pipe. Heretofore, the structure provided and used for determining the points of pipe adhesion had to be removed from the pipes each time the swinging gear was inserted. The mass 2 can then be sunk deeper into pipe 1 on its rod 3 in order to set the next lodged portion into swinging motion in a similar manner, and so on. When pipe 1 is dislodged from the earth's pressure either completely or up to a desired point, it can be pulled by the hydraulic presses in a similar manner, or it can be first cut in that place and then pulled. In this connection it is possible to do the cutting of pipe 1 in such a manner by disks 28 as shown in Figs. 9 and 10. Disks 28 are provided with cutting teeth around their periphery and are made to roll along the inner wall of the pipe at the particular place.

The embodiment in accordance with Fig. 4 illustrates schematically the realization of the invention according to the pendulum principle. Inside of pipe 1 a disk 5 is driven by its driving rod 6 in the direction of the arrow 7 and is made to roll on the inner pipe wall. As soon as the disk engages the inner wall of pipe 1 it rolls in the direction of arrow 8, i. e. in the opposite direction to that of arrow 7 or of the driving rod 6 and simultaneously executes a circular movement around circle 9 in the direction of arrow 10. In view of the fact that the diameter of disk 5 is smaller than the inside diameter of pipe 1 the geometrical center of disk 5, namely, the axis of rod 6, runs along circle 9 in the direction of arrow 10 when disk 5 rides on the inside surface of pipe 1. The ratio of the diameter of disk 5 to that of the inside diameter of pipe 1 determines the rotary motion of disk 5.

For the sake of illustration the difference between the diameters of disk 5 and pipe 1 is exaggerated in the drawing. In actual practice an endeavor will be made to have the diameter of disk 5 slightly smaller than the inside diameter of tube 1 in order to obtain as large a frequency of vibration as possible and as large a difference as possible between the speed of rotation of the driving rod 6 and the speed of rotation of the disk 5 in the direction of the arrow 8.

It can be made possible in this manner to obtain relatively high numbers of swinging movements with the normal number of drilling rotations of driving rod 6 which can be driven, for example, by means of the rotary table of a normal rotary drive. On the other hand, it is also possible to drive the driving rod 6 by special driving means, such as an electric motor or a water turbine which is lowered into the pipe 1 together with the disk 5.

Figure 5:
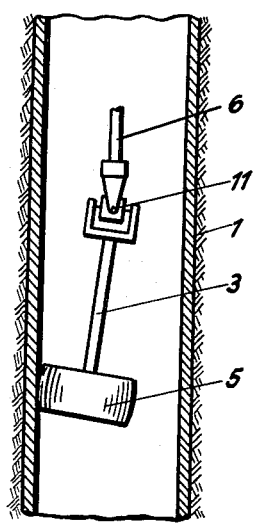
Fig. 5 shows a device incorporating the torsion pendulum principle in accordance with the invention, in side elevation within a pipe.

Fig. 5 illustrates an embodiment where the rod 3 of disk 5 is connected by means of a universal joint 11 with the drive shaft 6, for example the drill rod. Also here the difference between the diameter of the disk 5 and the diameter of the pipe 1 is exaggerated in order to better illustrate the invention. As stated, the universal joint 11, can be dispensed with by utilizing the elasticity of a suitably thin drill rod in order to achieve the rolling of the disk 5 along the inner wall of pipe 1 in accordance with the pendulum principle.

Figure 7:
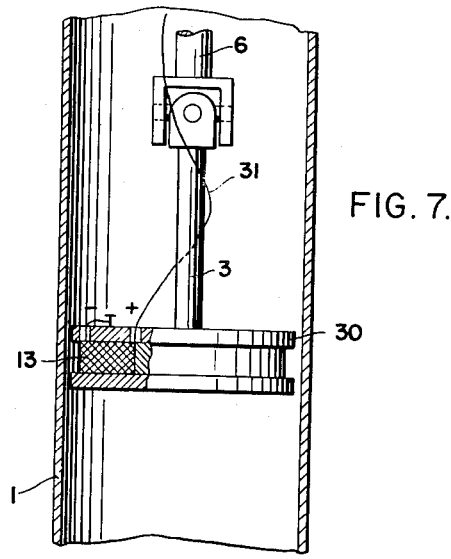
Fig. 7 is an elevational view partly in cross section of a rolling disk incorporating an electro-magnet.
Figure 6:
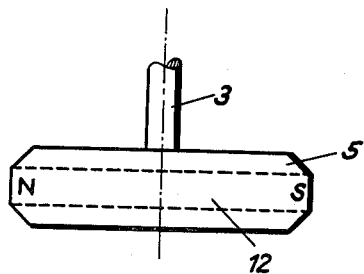
Fig. 6 shows an embodiment of a rolling disk incorporating a permanent magnet.

Fig. 6 illustrates an embodiment of the invention in which the disk 5 has been made magnetic by including a permanent magnet 12, while Fig. 7 illustrates an embodiment in which an electromagnet 13 is built into the disk 30. The direct current for energizing the magnet may be supplied through a pair of lead-in wires or may comprise a positive lead-in wire 31 wound around the rod 3 and shaft 6 with the negative wire of the magnet grounded to the pipe 1 as shown. The lead-in wires can also be inserted inside of the telescoping pieces of drive shaft if so desired. As stated above, it is the purpose of the magnets 12 and 13 to bring the disk 5 to rest immediately against the inner wall of pipe 1 in order to initiate at once the rolling in the direction opposite to the driving movement of the drive shaft 6.

Figure 8:
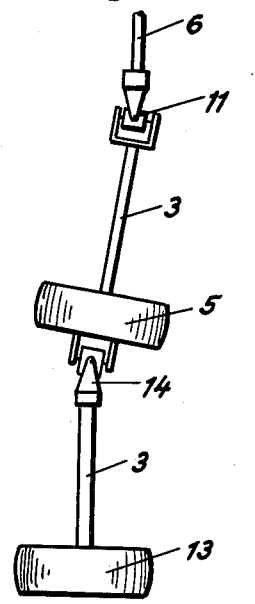
Fig. 8 is an embodiment of the invention having two fly-disks arranged one above the other.

Fig. 8 illustrates an embodiment of the invention in which two disks, 5 and 13, are arranged one above the other. The driving rod 3 of the lower disk 13 is here connected with the disk 5 by means of a universal joint 14. The universal joint 11 may also be omitted as explained above. Likewise the lower universal joint 14 may be dispensed with if the lower drive shaft 3 has sufficient length and elasticity.

The embodiment of the invention as illustrated schematically in Fig. 8 can be constructed in various ways to include several swinging members. For example, a plurality of disks 5 all of which or some of which may be magnetic, can be mounted upon a normal drill rod at a distance above one another and withor without universal joints. This makes it possible to cause a considerable length of pipe to swing while simultaneously also the entire drill rod with the disks may be moved up and down.

Figs. 9 and 10 illustrate how the mass 2 of Figs. 1 to 3 can be removed from the drill rod 3 and the cutter blade 28 substituted therefor. Fig. 10 particularly illustrates how a magnet such as magnet 30 of Fig. 7 may be used in combination with a cutter blade. Magnet 30 of Fig. 10 may be removed and a permanent magnet of the type shown in Fig. 6 substituted therefor.

As shown in Fig. 11 a drilling tower is provided for supporting the tools and equipment used for dislodging, cutting and removing pipes from subsurface borings. The tower comprises a rotating or turn table which is arranged to rotate an operating or drive rod 34. The drive rod unit 34 is suspended on a crane (not shown) in tower 32 and may comprise a plurality of individual drive rods 6 which are connected to one another at their ends to form the complete drive rod unit. At the lower end of the drive rod unit hangs the swinging device comprising the drill rod 3 and the mass or disk 5. Arranged at the surface end of pipe 1 usually within the drilling tower 32 is a hydraulic press comprising a pair of cylinders 36 and 37 which apply a pulling force longitudinally of pipe 1 through clamping means 38. The drive rod unit 34 is actuated by gears 39 and 40 symbolically shown in Fig. 11.

Fig. 12 illustrates one way of driving rod 6 by means of an electric motor which is lowered into pipe 1, together with disk 5. Fig. 13 illustrates another way of driving rod 6 by means of a water turbine which is lowered into pipe 1 together with disk 5 in the same manner as the motor 41 of Fig. 12.

The invention is by no means exhausted by the embodiments illustrated and described, but the principles on which it is based can be realized in any other manner desired.

In general it is pointed out that the swinging principle in accordance with the invention cannot only be used for effecting transverse vibrations along embedded pipe sections or for the construction of a pipe cutter, but it is also possible to employ the same principle in working machines of the vibrating or oscillating type. Vibratory screening devices are mentioned as an example. In such machines of the vibratory type the forces can be transferred directly by the rotating disk within a pipe to the machine proper. If the pipe which accommodates the rotating disk is made slightly conical and axially movable the vibrating frequency can be readily changed by simple longitudinal displacement of the pipe.

I claim:

1. A device arranged within a paramagnetic cylindrical body comprising a drill rod rotatably mounted within said body, a disk member secured to said drill rod adjacent one end thereof, said disk member having a mass which is substantially equally distributed around the axis of said drill rod and defining a surface of revolution, means for rotating said drill rod, and magnetic means for forcing said disk member into physical contact with the inner walls of said body for rolling contact with the inner surface of said body upon rotation of said drill rod.

2. A device arranged within a magnetically attractable cylindrical body comprising a drive shaft rotatably mounted within said body, a drill rod, a disk member secured to said drill rod adjacent one end thereof, said disk member having a mass which is substantially equally distributed around the axis of said drill rod and defining a surface of revolution, means for connecting the other end of said drill rod to one end of said shaft for rotation of said drill rod and said disk member with said shaft within said body, said drill rod and said disk member forming a pendulum movable circularly relative to said body upon rotation of said shaft, means for rotating said shaft, and magnetic means operative for forcing said disk member into physical contact with the inner walls of said body before rotation of said drill rod for rolling contact with the inner surface of said body.

3. A device arranged within a paramagnetic cylindrical body comprising a drive shaft rotatably mounted within said body, a drill rod, a weighted disk member secured to said drill rod adjacent one end thereof, said disk member having a mass which is substantially equally distributed around the axis of said drill rod and defining a surface of revolution, means comprising a universal joint for connecting the other end of said drill rod to one end of said shaft for rotation of said drill rod and said disk member with said shaft within said body, said drill rod and said disk member forming a pendulum movable circularly relative to said body upon rotation of said shaft, means for rotating said shaft, and magnetic means operative for forcing said disk member into physical contact with the inner walls of said body before rotation of said drill rod for rolling contact with the inner surface of said body.

4. A device arranged within a magnetically attractable cylindrical body comprising a drive shaft rotatably mounted within said body, a drill rod, a weighted disk member secured to said drill rod adjacent one end thereof, said disk member having a mass which is substantially equally distributed around the axis of said drill rod and defining a surface of revolution, means comprising a universal joint for connecting the other end of said drill rod to one end of said shaft for rotation of said drill rod and said disk member with said shaft within said body, said drill rod and said disk member forming a pendulum movable circularly relative to said body upon rotation of said shaft, means for rotating said shaft, and magnetic means arranged in the outer periphery of said disk member and operative for forcing said disk member into physical contact with the inner walls of said body before rotation of said drill rod for rolling contact with the inner surface of said body.

5. A device arranged within a magnetically attractable cylindrical body comprising a drive shaft rotatably mounted within said body, a drill rod, a weighted disk member secured to said drill rod adjacent one end thereof, said disk member having a mass which is substantially equally distributed around the axis of said drill rod and defining a surface of revolution, means comprising a universal joint for connecting the other end of said drill rod to one end of said shaft for rotation of said drill rod and said disk member with said shaft within said body, said drill rod and said disk member forming a pendulum movable circularly relative to said body upon rotation of said shaft, means for rotating said shaft, electromagnetic means arranged in and around the outer periphery of said disk member, and energizing means for said electromagnetic means for forcing said disk member into physical contact with the inner walls of said body before rotation of said shaft for rolling contact with the inner surface of said body.

References Cited in the file of this patent

UNITED STATES PATENTS

| | | |
|---|---|---|
| 1,671,528 | Hutchison | May 29, 1928 |
| 1,695,749 | Watson | Dec. 18, 1928 |
| 2,198,148 | Baily | Apr. 23, 1940 |
| 2,261,564 | Robichaux et al. | Nov. 4, 1941 |
| 2,304,330 | Bannister | Dec. 8, 1942 |
| 2,340,959 | Harth | Feb. 8, 1944 |
| 2,422,639 | Wenander | June 17, 1947 |
| 2,501,761 | D'Orcy | Mar. 28, 1950 |

FOREIGN PATENTS

| | | |
|---|---|---|
| 541,057 | Great Britain | Nov. 11, 1941 |